(12) United States Patent
Bansal et al.

(10) Patent No.: US 9,052,867 B2
(45) Date of Patent: Jun. 9, 2015

(54) FEEDBACK MECHANISM

(75) Inventors: Ravi P. Bansal, Tampa, FL (US); Rick A. Hamilton, II, Richmond, VA (US); Andrew R. Jones, Austin, TX (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 12/832,728

(22) Filed: Jul. 8, 2010

(65) Prior Publication Data
US 2012/0007794 A1  Jan. 12, 2012

(51) Int. Cl.
G09G 5/00 (2006.01)
G06F 3/14 (2006.01)

(52) U.S. Cl.
CPC .................................. G06F 3/1454 (2013.01)

(58) Field of Classification Search
CPC .................................................. G06F 3/1454
USPC .................. 345/2.1, 156, 173–183, 1.1–3.4, 345/30–111, 530–574; 709/212; 710/22
See application file for complete search history.

(56) References Cited

U.S. PATENT DOCUMENTS

| | | | |
|---|---|---|---|
| 5,859,979 A | 1/1999 | Tung et al. | |
| 6,151,622 A | 11/2000 | Fraenkel et al. | |
| 6,341,316 B1 | 1/2002 | Kloba et al. | |
| 6,343,313 B1 * | 1/2002 | Salesky et al. | 709/204 |
| 6,349,286 B2 | 2/2002 | Shaffer et al. | |
| 6,354,748 B1 | 3/2002 | Vrvilo | |
| 6,484,189 B1 | 11/2002 | Gerlach, Jr. et al. | |
| 6,760,749 B1 | 7/2004 | Dunlap et al. | |
| 7,061,871 B2 | 6/2006 | Sheldon et al. | |
| 7,236,926 B2 | 6/2007 | Scherpbier et al. | |
| 7,490,169 B1 | 2/2009 | Ogdon et al. | |
| 7,600,240 B2 | 10/2009 | Katayama et al. | |
| 7,636,805 B2 | 12/2009 | Rosenberg | |
| 7,688,344 B2 | 3/2010 | Kimber et al. | |
| 7,707,303 B2 | 4/2010 | Albers et al. | |
| 7,853,711 B1 | 12/2010 | Johnson et al. | |
| 7,877,443 B2 | 1/2011 | Lyle et al. | |
| 2002/0085030 A1 | 7/2002 | Ghani | |
| 2002/0097857 A1 | 7/2002 | Kwan | |
| 2002/0105914 A1 | 8/2002 | Duron | |

(Continued)

OTHER PUBLICATIONS

Edwards, James A; Final Office Action; Feb. 23, 2010; USPTO.

(Continued)

*Primary Examiner* — Kumar Patel
*Assistant Examiner* — Insa Sadio
(74) *Attorney, Agent, or Firm* — Robert C. Rolnik (57) ABSTRACT

A feedback application may be executing on a data processing system to transmit a screen update to at least two computers. The feedback application receives an indication of completion from a first computer, in response to transmitting the screen update. The feedback application updates a completion gauge to indicate a partial completion among participants, in response to receiving the indication of completion from the first computer. The feedback application receives a second indication of completion from a second computer, in response to transmitting the screen update. The feedback application updates the completion gauge to indicate a completion among participants, in response to receiving the indication of completion from the second computer.

14 Claims, 5 Drawing Sheets

(56) References Cited

U.S. PATENT DOCUMENTS

| | | |
|---|---|---|
| 2003/0091000 A1 | 5/2003 | Chu et al. |
| 2003/0227479 A1* | 12/2003 | Mizrahi et al. ............ 345/753 |
| 2004/0022322 A1 | 2/2004 | Dye |
| 2004/0042601 A1 | 3/2004 | Miao |
| 2004/0239754 A1 | 12/2004 | Shachar et al. |
| 2004/0253991 A1 | 12/2004 | Azuma |
| 2005/0138122 A1 | 6/2005 | Boehringer et al. |
| 2005/0198134 A1 | 9/2005 | Kenoyer et al. |
| 2005/0254440 A1 | 11/2005 | Sorrell |
| 2006/0020665 A1* | 1/2006 | Hagale et al. ............ 709/204 |
| 2006/0112168 A1 | 5/2006 | Albers et al. |
| 2006/0132607 A1 | 6/2006 | Kimber et al. |
| 2006/0173959 A1 | 8/2006 | McKelvie et al. |
| 2006/0187967 A1 | 8/2006 | FitzGerald et al. |
| 2006/0235927 A1 | 10/2006 | Bhakta et al. |
| 2006/0271624 A1 | 11/2006 | Lyle et al. |
| 2006/0274655 A1 | 12/2006 | Richter et al. |
| 2007/0028142 A1 | 2/2007 | Elsner et al. |
| 2007/0214423 A1* | 9/2007 | Teplov et al. ............ 715/751 |
| 2007/0245248 A1* | 10/2007 | Christiansen ............ 715/753 |
| 2008/0222252 A1 | 9/2008 | White |

OTHER PUBLICATIONS

Edwards, James A; Final Office Action; Jun. 19, 2009; USPTO.
Edwards, James A; Final Office Action; Jun. 22, 2010; USPTO.
Edwards, James A; Final Office Action; Aug. 12, 2011; USPTO.
Edwards, James A; Office Action; Feb. 24, 2011; USPTO.
Edwards, James A; Office Action; Dec. 23, 2008; USPTO.
Bostick, et al; Amendment After Final; May 25, 2010; USPTO.
Bostick, et al; Amendment After Final; Sep. 22, 2010; USPTO.
Bostick, et al; Appeal Brief; Nov. 19, 2009; USPTO.
Bostick, et al; Appeal Brief; Nov. 22, 2010; USPTO.
Bostick, et al; Response to Office Action; Mar. 23, 2009; USPTO.
Bostick, et al; Response to Office Action; May 20, 2011; USPTO.
Bostick, et al; Supplemental Response to Office Action; Mar. 30, 2009; USPTO.
Bostick, James E; Final Office Action; Feb. 23, 2010; USPTO.
Bostick, James E; Final Office Action; Jun. 19, 2009; USPTO.
Don Hergert; PC Anywhere; http://web.archive.org/web/20040104143833/http://www.pocketpcmag Jan. 1, 2007.

* cited by examiner

FEEDBACK MECHANISM

BACKGROUND OF THE INVENTION

1. Field of the Invention

The present invention relates generally to a computer implemented method, data processing system, and computer program product for conducting virtual presentations through networked computers. More specifically, the present invention relates to receiving feedback, at a hosting computer, concerning the progress of rendering updated presentation data to participant displays.

2. Description of the Related Art

Presentation of computer outputs to additional computers on a network has been available for ten or more years. The data processing systems that generate the presentations or participate in them rely on software generally called screen sharing applications. A screen sharing service example is the IBM® Lotus® Sametime® plugin called InstantShare. IBM, Lotus and Sametime are trademarks of International Business Machines Corporation in the United States, other countries, or both. For example, the presenter can present an entire screen to a distant user for real-time or near real-time viewing.

Currently, no screen sharing software permits a subset of participants to be given privileges to see presenter-selected parts of the screen not available to another subset of participants. A participant is a computer that is receiving updates to a presentation. In addition, the presenter is not provided feedback concerning how many participants have received an up-to-date view of the presenter's current screen.

SUMMARY OF THE INVENTION

The present invention provides a computer implemented method, computer program product, and data processing system for obtaining feedback among participant computers. A feedback application may be executing on a data processing system to transmit a screen update to at least two computers. The feedback application may determine that a first computer has completely received the screen update. The feedback application updates a completion gauge to indicate a partial completion among participants, in response to a determination that the first computer has completely received the screen update. The feedback application may determine whether a second computer has completely received the screen update, in response to transmitting the screen update. The feedback application updates the completion gauge to indicate a completion among participants, in response to a determination that the second computer has completely received the screen update.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
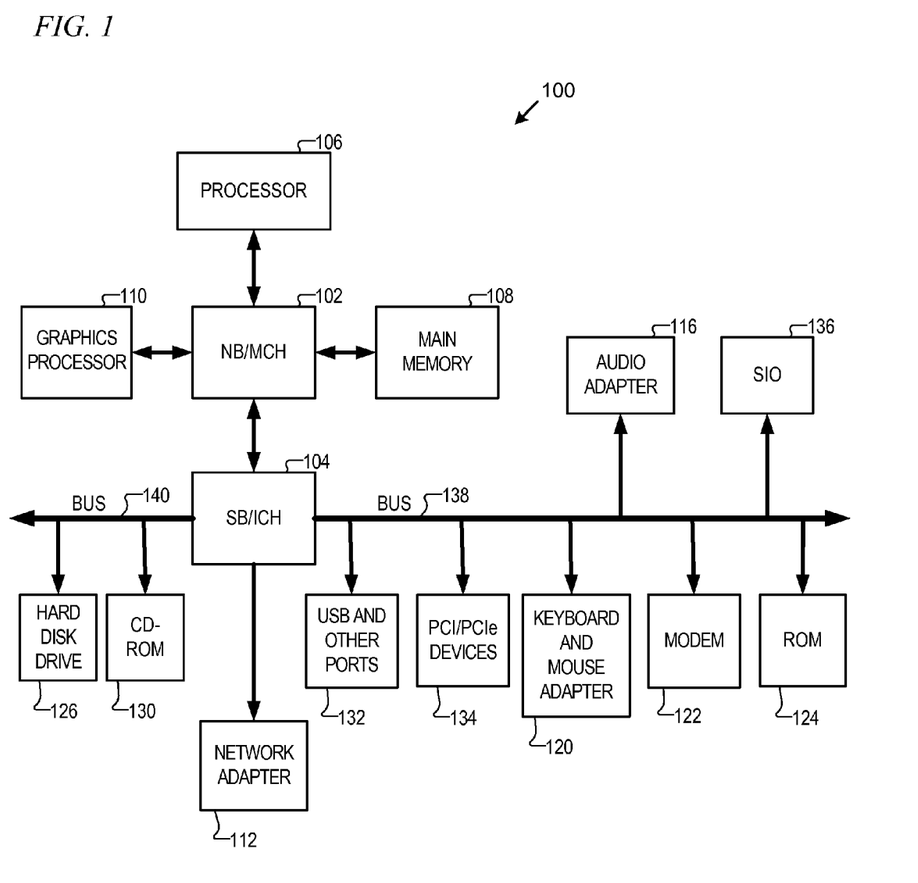
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) having computer readable program code embodied thereon.

Any combination of one or more computer readable storage device(s) may be utilized. The term "computer-readable storage device" does not encompass a signal propagation media such as a copper cable, optical fiber or wireless transmission media. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit a presenter to see feedback of a group, if not all, users statuses with respect to updates made from the presenter to the users in the group. The feedback accounts for delays that can occur in the Internet, a user's Internet service provider, a user's local network and/or shortcomings of a user's computer with respect to the receiving and/or rendering of presentation updates to the group as a whole.

Figure 2A:
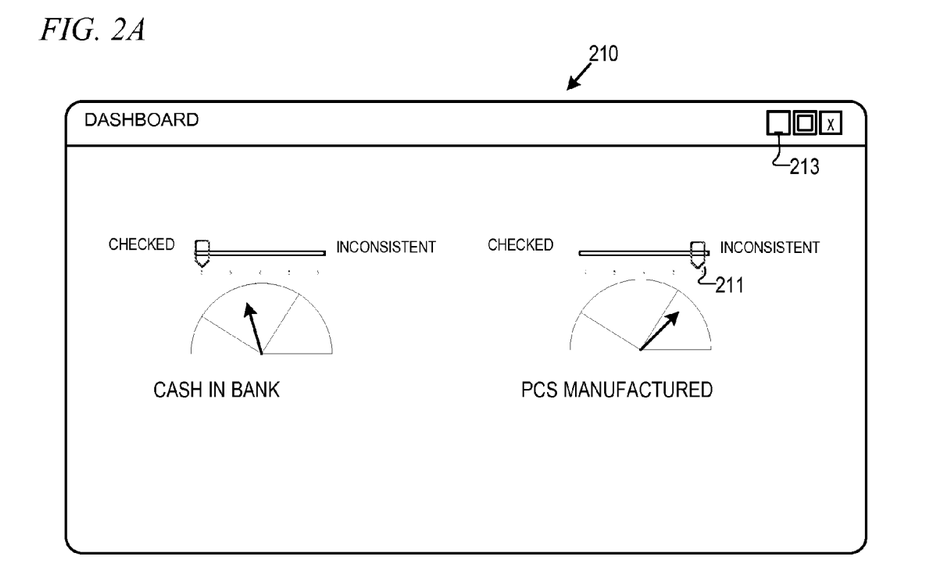
FIG. 2A is a user display showing a fully updated user display in accordance with an illustrative embodiment of the invention.

FIG. 2A is a user display showing a fully updated user display in accordance with an illustrative embodiment of the invention. The display may be shown at a user's computer during the attendance in a virtual presentation organized over, and using the resources of, a network of data processing systems. The display is comprised of visual elements. A visual element is a visible feature of a rendered display image that can comprise a part or a whole of an update. A visual element can be a mouse cursor. A visual element can be, for example, a window, such as window 210. A visual element can be, for example, a slide bar 211. A visual element can be, button 213. A complete visual element is a visual element that has been rendered and persists on a user's display. FIG. 2A shows the visual element, window 210, as a detailed visual element. A detailed visual element is a visual element that is rendered in all details, or at least to the extent that a client can display the corresponding color and resolution of the source of the visual element, namely, the presenter's computer.

Figure 2B:
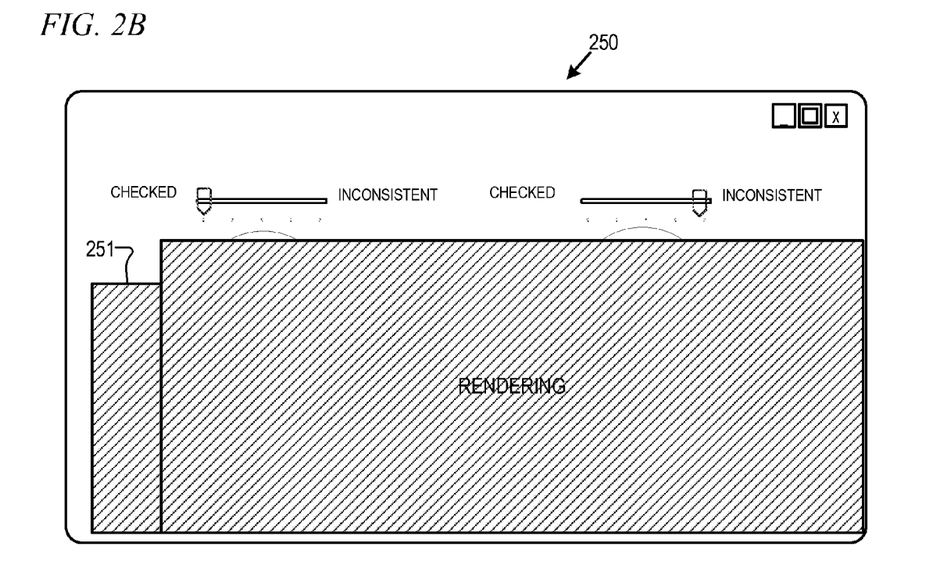
FIG. 2B is a user display showing an incomplete visual element in draft mode in accordance with an illustrative embodiment of the invention.

FIG. 2B is a user display showing an incomplete visual element in draft mode in accordance with an illustrative embodiment of the invention. An incomplete visual element is a visual element that lacks detail, but has a visual placeholder that indicates the in-progress nature of the visual element. Visual element 250 is a window, which may correspond to one of several windows shared from a presenter's display. Nevertheless, visual element 250 may be an out-of-date view of the presenter's shared window. An incomplete visual element is a visual element that either has been displayed as a draft mode for a visual element, or has been rendered only in part on a display.

Visual element 250 may be rendered in draft mode. A draft mode for a visual element is a rendering of the visual element with only part details prior to obtaining full details of the visual element. For example, an outline of the visual element may be rendered when displaying a draft mode of a visual element. Similarly, parts of the outline can be filled in as new data arrives and is rendered for the visual element. Draft mode can be indicated by progressively rendering parts of the window in a grid fashion. Accordingly, draft mode can include placing mask 251 over parts that are being rendered. The mask can be opaque. In other words, it can be a solid color. The mask can be transparent, and thus provide some vague details concerning the presentation. Explanatory text can be superimposed on the mask, as needed. Although FIG. 2B shows a single visual element in draft mode, it is appreciated that multiple visual elements may be in draft-mode simultaneously.

Figure 2C:
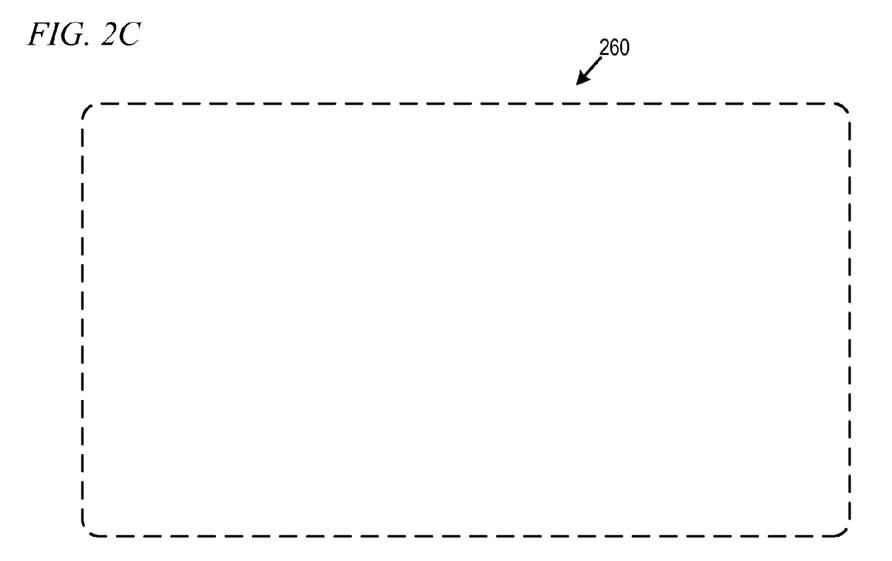
FIG. 2C shows an alternative way to show draft-mode in a client in accordance with an illustrative embodiment of the invention.

FIG. 2C shows an alternative way to show draft-mode in a client in accordance with an illustrative embodiment of the invention. While data concerning the visual element of a window is still being received, the client can place a dashed line box-like figure in the location where the visual element (in this case a window) will be placed. Dashed line box 260 is an incomplete visual element. It is appreciated that shapes other than boxes can be displayed as incomplete visual elements. For example, a cursor may have a shape other than a rectangle.

Figure 3:
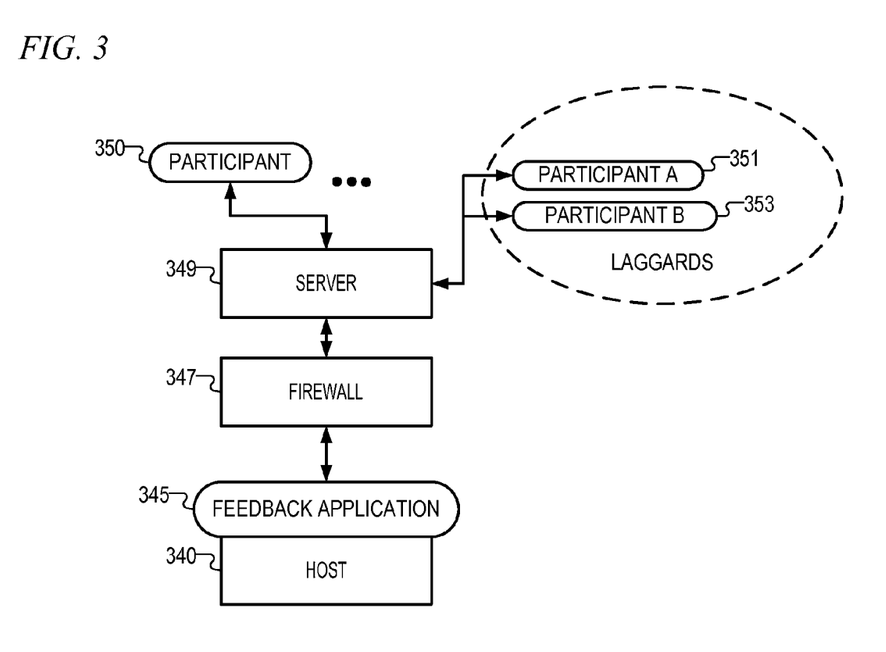
FIG. 3 is a block diagram of data processing systems used in accordance with an illustrative embodiment of the invention.

FIG. 3 is a block diagram of data processing systems used in accordance with an illustrative embodiment of the invention. Host 340 is a computer or data processing system that is used to be the source of presentation details. Participant 350 is a computer or data processing system that receives updates for the presentation, in response to changes made by host 340. Feedback application 345 may be a software component resident to host 340 that modifies the presentation view to a presenter that controls the host. For example, the presenter may be operating the host as a personal computer, whereby the presenter is seated at host 340. One or more firewalls and servers may provide additional services to the presenter and participants, for example, server 349 and firewall 347.

Some participants may be remote or subject to atypically low bandwidth, such as present in a dial-up modem. Participant A 351 may be located at a base-camp to Mt. Everest, and may accordingly, be subject to routing delays due to being remote from host 340. Participant B 353 may be on a sailboat on the high seas. Accordingly, participant B 353 may rely on a low data-rate satellite connection that causes participant B to always get updates after the majority of non-laggard participants. The presenter at host 340 may be aware of chronic connection difficulties with participant A and participant B, and accordingly, identify or otherwise select participant A and participant B to be placed in a laggard set. A laggard set is a set of users for whom the user-experience is believed to be permanently degraded as compared to the majority of participants, such as participant 350. A feedback application may identify a minority of participants as being laggards, and either automatically, or with approval of the presenter, place such users into the laggard set. Participants not selected for the laggard set are non-laggard participants.

In one embodiment, a laggard set may be an array that is empty in response to initiating a screen sharing session. The feedback application may identify laggards by monitoring and alerting the presenter about those clients, whose rendering or other completion acknowledgements are delayed. By use of the term 'delayed', comparison is being made between one client and a peer client to a screen sharing session. For example, the 10% slowest clients may be considered to be delayed with respect to the remaining 90% of the clients. The feedback application can either automatically, or with presenter approval, place such delayed clients in the laggard set. Another alternative is that the presenter may manually select certain clients whom he already knows as being habitual laggards based on his prior knowledge of their whereabouts or based on his experience with them. Then, the presenter may decide to manually place them in the laggard set at the beginning of a presenting session. In other words, the presenter may identify participants through a user interface of the data processing system, and the feedback application may place the participant identifiers in an array, or other suitable data structure. In another embodiment, laggard sets may also be carried over to the next session if the presenter believes that the composition of the laggard set and the circumstances of those in the laggard set have not changed between the sessions. In other words, among the final steps concluding a session, the feedback application may store the laggard set for re-use in, for example, a file. Accordingly, such an embodiment can be helpful when a session ends for a coffee break or other short interval prior to initiating another screen sharing session.

Figure 4:
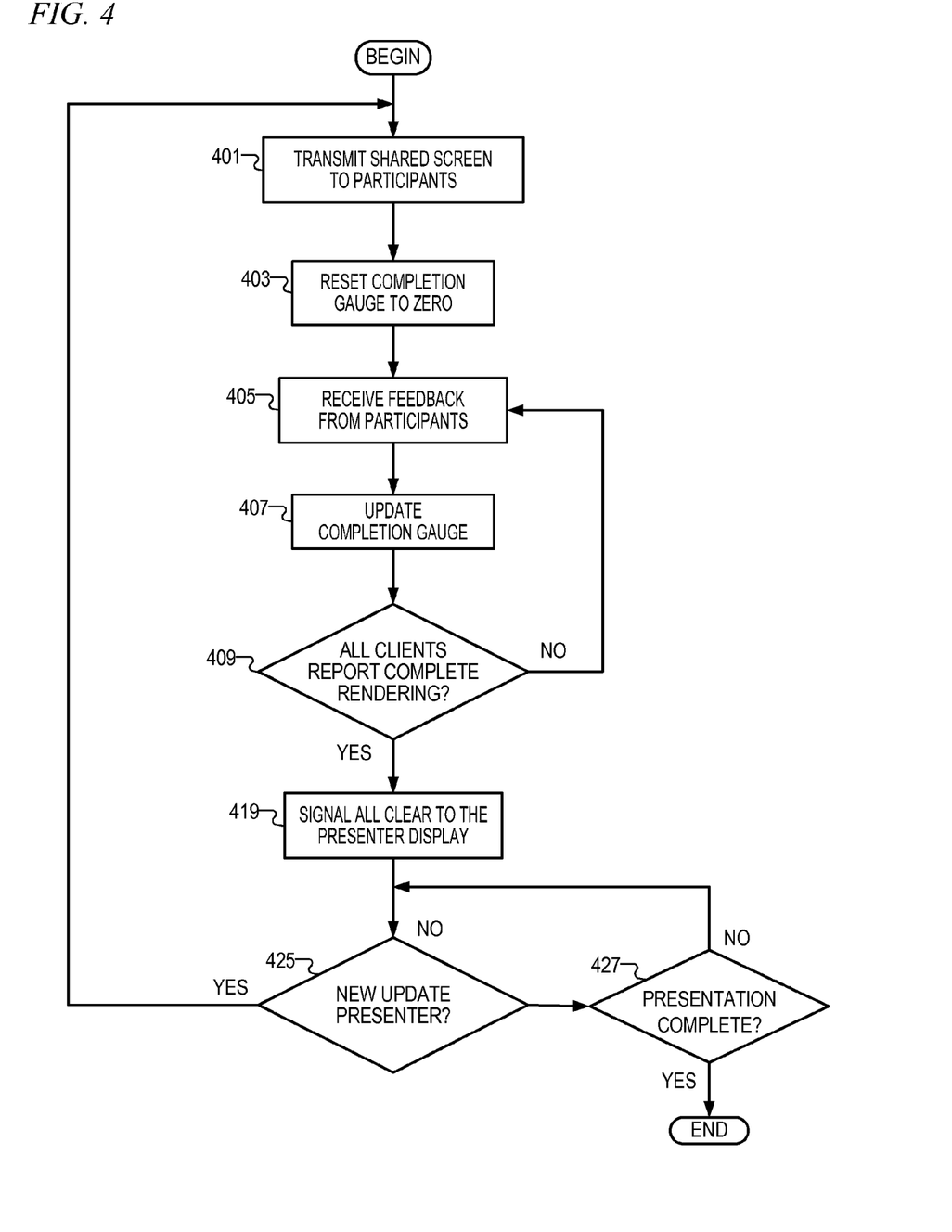
FIG. 4 is a flowchart of a process operating at a presenter computer in accordance with an illustrative embodiment of the invention.

FIG. 4 is a flowchart of a process operating at a presenter computer in accordance with an illustrative embodiment of the invention. A presenter computer may be a data processing system such as, for example, data processing system 100 of FIG. 1. FIG. 4 may depict the routine updates of a presentation that is already in progress. Initially, the feedback application may transmit a shared screen to participants (step 401). The screen may be comprised of one or more host visual elements within a screen update. A host visual element is a visual element selected by the presenter for sharing in a presentation. A screen update is a combination of summary, visual elements, and an end-of frame.

The screen update can include both a summary of visual elements, as well as the visual elements themselves. Preferably, the summary of the visual elements is transmitted earliest in an update, while the visual elements are transmitted later in the update. A summary of a visual element is an identification of a visual element and information concerning the relative placement of the visual element among other visual elements shared. The summary of a visual element may include the contours of the visual element. At the beginning of an update, all participants are in an out-of-date state with respect to the host visual elements. "Visual elements to be rendered" is the list of visual elements modified in a recent change at the host. "Visual elements to be rendered" may be one or more visual elements. For example, "visual elements to be rendered" may be a second slide among slides in a IBM® Lotus® Symphony™ slide set, where the entire slide is a single visual element.

An out-of-date state with respect to a host visual element is a description of state stored at either the participant or the host concerning a recorded difference between a host visual element and the corresponding state of rendering of the visual element at the participant. The state of a visual element may be up-to-date in response to all features of the visual element being displayed to the participant computer display. Accordingly, the resultant state can be transmitted to the host, whereby the host updates its accounting of the state of that participant for that visual element.

Next, the feedback application may reset a completion gauge for one or more visual elements to zero (step 403). The completion gauge is an indicator of the degree to which an associated visual element is rendered among the participants, or at least the non-laggard participants. The gauge can show a partial completion among participants. The completion gauge may be a number, periodically updated to show progress. Alternatively, the completion gauge may be a progress indicator that is filled over time in proportion to the reports of progress from the participants. Resetting the completion gauge may include displaying the completion gauge to the presenter's display. The presenter's display is the display of the host. The completion gauge may be a number or meter that expresses the number of participants receiving all visual elements of the update as divided by the number of participants.

As can be appreciated the completion gauge can exclude or discount a subset of participants identified as laggards. The subset of participants identified as laggards may be according to any of the methods as described above.

Next, the feedback application may receive feedback from participants (step 405). Where no segregation of clients into laggard and non-laggard sets has occurred, all feedback can be used to show progress to the presenter. On the other hand, where some users are in the laggard set, such feedback can be discarded for purposes of future revision to completion gauges. The host may receive feedback in the form of rendering reports. A rendering report is a report that feeds back to a host or presenter computer a number of visual elements rendered or received at a client computer and/or the percentage of one or more of the visual elements are complete in being rendered or received at the client computer. A rendering report can be an indication that all visual elements are complete.

Next, the feedback application may update the completion gauge based on feedback periodically received for the update (step 407). Next, the feedback application may determine whether a first computer has completely received the screen update, in response to transmitting the screen update. For example, the feedback mechanism may make this determination by determining whether all clients report complete rendering of the visual elements of the last update (step 409). By 'all clients', it may be meant that the set of 'all clients' is the set of non-laggard participants. Otherwise, when no distinction is made between laggards and non-laggards, the term 'all clients' may mean all participants in the current presentation. Consequently, the determination at step 409 may be influenced by whether indications of completion are received at the host. An indication of completion is a preset byte or other predetermined data sequence that can indicate an up-to-date state of data received at a client computer or participant's computer.

During an interval between sending an update, and receiving indications of completion from all clients, the presenter may accumulate received indications of completion to a set of previously received indications of completion. The 'previously received' is in reference to a specific update and the set of previously received indications of completion are those indications arriving in response to that update. In other words, the feedback application may count the number of such indications received. Accordingly, the number may operate as a numerator as compared to the number of participants or the number of participants that are non-laggards—thereby forming a ratio to be rendered in a completion gauge.

Alternatively, a determination that a first computer has completely received the screen update may be accomplished in other ways. The determination can be performed in response to a conclusion of sending packets to a client. This determination may be in response to receiving acknowledgments for each packet sent to the client. This determination may be in response to detecting a break in network activity, such as an absence of data transmitted to a client in a Transmission Control Protocol (TCP) stack. Such a break in network activity can signal a conclusion as an alternative way to determine that a first computer has completely received the screen update at step 409. The break in network activity may occur in response to a determination that the client has not requested a retransmit of any packets of the screen update. Accordingly, after a suitable time-out period, the feedback application may determine that the first computer has complete received the screen update.

A negative determination may cause steps 405 and 407 to be repeated. Accordingly, the steps 405, 407, and 409 may be exited in response to a determination that all clients report complete rendering. Consequently, the feedback application may present an "all clear" message to the presenter display (step 419). The all clear message can be the dismissal of the completion gauge from the screen. Alternatively, the all clear message can be the indication in the completion gauge of 100% complete.

Next, the feedback application may determine whether a new update is made from the presenter (step 425). If not, the feedback application may determine whether the presentation is complete (step 427). In response to a positive determination at step 427, processing may terminate. If the presentation is not complete, step 425 may be repeated.

A positive determination to step 425 may result in the feedback application repeating step 401.

It is appreciated that as an alternative to showing a completion gauge to the presenter, illustrative embodiments of the invention may place a graphic filter over a visual element so that the presenter is aware of which visual element is being rendered in an incomplete fashion among the participants. Such a graphic filter may be triggered to be effective only for the participants that are non-laggard participants. A graphic filter is a graphical effect applied to a visual element. In particular, the graphic filter can degrade visibility of an out-of-date host visual element. The graphic filter can modify the host visual element to form a wire frame or a translucent overlay effect to the out-of-date host visual element.

Accordingly, an out-of-date host visual element is an element that is updated on the host, but is not yet updated at the participants, or at least the non-laggard participants. Although, the host may render visual elements to the presenter using the graphic filter, the appearance of the filter is solely for the benefit of the host, and accordingly is not transmitted or rendered to the participants.

Figure 5:
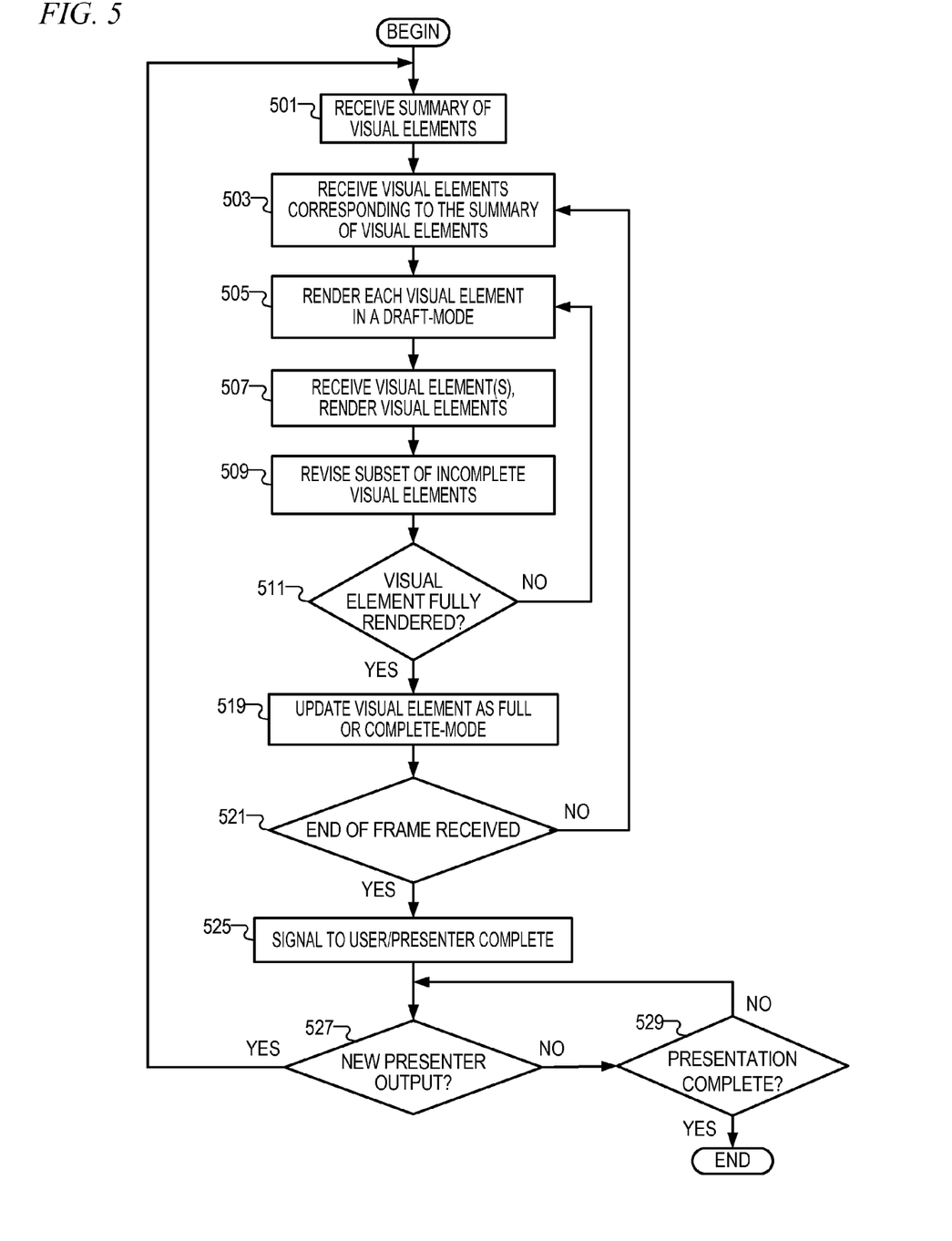
FIG. 5 is a flowchart of a process operating at a client or user computer in accordance with an illustrative embodiment of the invention.

FIG. 5 is a flowchart of a process operating at a client or user computer in accordance with an illustrative embodiment of the invention. Initially, a participant receives a summary of visual elements (step 501). A client can be a participant for example, participant 350 of FIG. 3. Next, the client may receive visual elements corresponding to the summary of visual elements (step 503). Each visual element identified in the summary or otherwise received in partial form belongs to a subset of the visual elements of the summary. Thus, a subset of incomplete visual elements is the set of visual elements identified in the summary of visual elements, but without the subset of visual elements received at the client.

Next, the client renders each visual element of the subset of incomplete visual elements in a draft-mode (step 505). Next, the client receives visual elements and renders visual elements (step 507). Next, the client revises the subset of incomplete visual elements (step 509).

Next, the client may determine whether a visual element is fully rendered (step 511). More than one visual element may be detected as fully rendered. If a visual element is not fully rendered, processing may repeat at step 505.

If a visual element is fully rendered, or at least a new visual element has progressed to being fully rendered since a previous execution of step 511, the client may make a positive determination. A positive determination can result in the client updating the visual element as full or complete-mode (step 519). Complete-mode is a mode where the visual element is rendered in the manner that corresponds to the host visual element. Accordingly, any graphical effects used in draft-mode are removed from any visual element detected to be fully rendered.

Next, the client may determine whether an end-of-frame is received (step 521). A frame is the content of a screen update, including the summary of visual elements, as well as the actual visual element descriptions. An end-of-frame is an indicator in a final packet from a host concerning a single update. Both summaries of visual elements as well as the visual element descriptions will be received at a participant computer prior to receiving the end-of-frame for the update within which the visual elements are transmitted.

A final incomplete visual element is a last of one or more visual elements to be rendered fully at a client computer, in response to an update being sent the client computer. The final incomplete visual element may be fully rendered before, during or after the receipt of the end-of-frame.

Consequently, a negative result to the question of "end-of-frame received" (step 521) may cause the client to receive visual elements corresponding to the summary of visual elements at step 503. On the other hand, a positive result may cause the client to signal to the presenter or host that the update was received completely (step 525). In other words, the client may send an all-complete signal to the host. An all-complete signal is a signal made when all visual elements are received and/or rendered in response to an update being sent the client computer. The all-complete signal can be a change to an icon on the presenter's screen that indicates completion. For example, an icon colored red when a non-laggard group is not yet complete in receiving visual elements. In response to signaling "all-complete", the icon can be changed to green.

Next, the client may determine whether new presenter output is received (step 527). New presenter output may include a further update. A positive result can cause the client to repeat the whole process at step 501. However, a negative result can cause the client to determine whether the presentation is complete (step 529). A host computer may transmit an indication that a presentation is complete in response to the presenter concluding its presentation. A negative determination at step 529 can cause the client to repeat step 527. On the other hand, a positive determination at step 529 can cause the processing to terminate.

A rendering report is a report that feeds back to a host or presenter computer a number of visual elements rendered or received at a client computer and/or the percentage one or more of the visual elements are complete in being rendered or received at the client computer. A rendering report can be transmitted as an all-complete signal. Alternatively, the rendering report can be sent in response to determining a new visual element has transitioned from incomplete to complete at the client.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining and displaying status of a plurality of computers of recipients of a presentation, the method comprising:

a computer of a presenter of the presentation receiving a specification of first and second separate groups of the recipients' computers, wherein the presenter's computer receives the specification of the first and second groups from the presenter, and an indication that the first group of the recipients' computers is slower than the second group of recipients' computers in receiving updates to a screen that is used in the presentation and sent by the presenter's computer, all of the recipient computers of the first and second groups being programmed to respond to receipt of a screen update from the presenter with an indication of receipt of the screen update;

subsequently, the presenter's computer transmitting a current screen update, used in the presentation, to the plurality of recipients' computers;

the presenter's computer receiving a first indication that a first recipient's computer of the second group has completely received the current screen update, and in response, the presenter's computer updating a graphical gauge displayed to the presenter to indicate receipt of the current screen update by some, but not all of the recipients' computers in the second group irrespective of whether any recipient computer of the first group of members has received the current screen update;

the presenter's computer receiving a second indication that a recipient's computer of the first group has completely received the current screen update;

subsequently, the presenter's computer receiving indications from all other recipients' computers of the second group of complete receipt of the current screen update, and in response, the presenter's computer updating the graphical gauge to indicate full completion of receipt of the current screen update by all the recipients' computers of the second group irrespective of whether any recipient computer of the first group of members has transmitted an indication of receipt of the current screen update.

2. The method of claim 1, further comprising receiving statistics about a rendering response speed from each recipient's computer and, on that basis, reporting to the presenter's computer a slowest group of recipients' computers, wherein in receiving the first indication that the first recipient's computer of the second group has completely received the current screen update is responsive to reporting to the presenter's computer the slowest group of computers.

3. The method of claim 1, wherein updating the graphical gauge to indicate full completion of receipt of the current screen update by all the recipients' computers of the second group comprises removing the graphical gauge from the presenter's screen.

4. The method of claim 3, further comprising:

responsive to transmitting the current screen update to at least two recipient computers, transmitting a summary of visual elements of the screen update.

5. The method of claim 4, wherein the first indication is based on the summary of visual elements.

6. The method of claim 3, wherein the first indication is a predetermined data sequence that indicates an up-to-date state with respect to data received at the first recipient's computer.

7. A method for determining and displaying status of a plurality of computers of recipients of a presentation, the method comprising:

a computer of a presenter of the presentation receiving a specification of first and second separate groups of the recipients' computers, and an indication that the first group of the recipients' computers is slower than the second group of recipients' computers in receiving updates to a screen that is used in the presentation and sent by the presenter's computer, all of the recipient computers of the first and second groups being programmed to respond to receipt of a screen update from the presenter with an indication of receipt of the screen update;

subsequently, the presenter's computer transmitting a current screen update, used in the presentation, to the plurality of recipients' computers;

the presenter's computer receiving a first indication that a first recipient's computer of the second group has completely received the current screen update, wherein the first indication indicates which visual element, among a group of visual elements that comprise the screen update, is completely rendered to the first recipient's computer, wherein out-of-date host visual elements are a remainder among the group of visual elements that comprise the screen update, relative to visual elements that are completely rendered to the first recipient's computer;

in response to receiving a first indication that a first recipient's computer of the second group has completely received the current screen update, the presenter's computer updating a graphical gauge displayed to the presenter to indicate receipt of the current screen update by some, but not all of the recipients' computers in the second group irrespective of whether any recipient computer of the first group of members has transmitted an indication;

the presenter's computer receiving a second indication that a recipient's computer of the first group has completely received the current screen update;

subsequently, the presenter's computer receiving indications from all other recipients' computers of the second group of complete receipt of the current screen update, and in response, the presenter's computer updating the graphical gauge to indicate full completion of receipt of the current screen update by all the recipients' computers of the second group irrespective of whether any recipient computer of the first group of members has received the current screen update; and rendering, to a display of the presenter's computer, a graphic filter to each out-of-date host visual element to degrade its visibility.

8. A computer program product for determining and displaying status of a plurality of computers of recipients of a presentation, the computer program product comprising:

a computer readable storage device and program instructions stored thereon, the program instructions comprising:

program instructions to receive, by a computer of a presenter of the presentation, a specification of first and second separate groups of the recipients' computers, and an indication that the first group of the recipients' computers is slower than the second group of recipients' computers in receiving updates to a screen that is used in the presentation and sent by the presenter's computer, all of the recipient computers of the first and second groups being programmed to respond to receipt of a screen update from the presenter with an indication of receipt of the screen update, wherein the presenter's computer receives the specification of the first and second groups from the presenter;

program instructions to subsequently transmit, via the presenter's computer, a current screen update, used in the presentation, to the plurality of recipients' computers;

program instructions to receive, at the presenter's computer, a first indication that a first recipient's computer of the second group has completely received the screen update and in response, update a graphical gauge displayed to the presenter to indicate receipt of the current screen update by some, but not all of the recipients' computers in the second group irrespective of whether any recipient computer of the first group of members has received the current screen update;

program instructions to receive, at the presenter's computer, a second indication that a recipient's computer of the first group has completely received the current screen update; and program instructions to receive, subsequently, indications from all other recipients' computers of the second group of complete receipt of the current screen update, and in response, update, at the presenter's computer, the graphical gauge to indicate full completion of receipt of the current screen update by all recipients' computers of the second group irrespective of whether any recipient computer of the first group of members has transmitted an indication of receipt of the current screen update.

9. The computer program product of claim 8, further comprising program instructions to receive statistics about a rendering response speed from each recipient's computer and, on that basis, report to the presenter's computer a slowest group of recipients' computers, wherein program instructions to receive the first indication that the first recipient's computer of the second group has completely received the current screen update is responsive to reporting to the presenter's computer the slowest group of computer.

10. The computer program product of claim 8, wherein program instructions to update the graphical gauge to indicate full completion of receipt of the current screen update by all the recipients' computers of the second group comprises program instructions to remove the graphical gauge from the presenter's screen.

11. The computer program product of claim 10, further comprising:

program instructions to transmit the current screen update.

12. The computer program product of claim 11, wherein the first indication is based on the summary of visual elements.

13. The computer program product of claim 10, wherein the first indication is a predetermined data sequence that indicates an up-to-date state with respect to data received at the first recipient's computer.

14. A computer program product for determining and displaying status of a plurality of computers of recipients of a presentation, the computer program product comprising:

a computer readable storage device and program instructions stored thereon, the program instructions comprising:

program instructions to receive, by a computer of a presenter of the presentation, a specification of first and second separate groups of the recipients' computers, and an indication that the first group of the recipients' computers is slower than the second group of recipients' computers in receiving updates to a screen that is used in the presentation and sent by the presenter's computer, all of the recipient computers of the first and second groups being programmed to respond to receipt of a screen update from the presenter with an indication of receipt of the screen update, wherein the first indication indicates which visual element, among a group of visual elements that comprise the screen update, is completely rendered to the first recipient's computer, wherein out-of-date host visual elements are a remainder among the group of visual elements that comprise the screen update, relative to visual elements that are completely rendered to the first recipient's computer;

program instructions, in response to receiving a first indication that a first recipient's computer of the second group has completely received the screen update, to update a graphical gauge displayed to the presenter to indicate receipt of the current screen update by some, but not all of the recipients' computers in the second group irrespective of whether any recipient computer of the first group of members has received the current screen update;

program instructions to receive, at the presenter's computer, a second indication that a recipient's computer of the first group has completely received the current screen update;

program instructions to receive, subsequently, indications from all other recipients' computers of the second group of complete receipt of the current screen update, and in response, update, at the presenter's computer, the graphical gauge to indicate full completion of receipt of the current screen update by all recipients' computers of the second group irrespective of whether any recipient computer of the first group of members has transmitted an indication of receipt of the current screen update; and program instructions to render, to a display of the presenter's computer, a graphic filter to each out-of-date host visual element to degrade its visibility.

* * * * *